United States Patent [19]
Stenger et al.

[11] Patent Number: 5,810,418
[45] Date of Patent: Sep. 22, 1998

[54] DASHBOARD ATTACHMENT KIT

[76] Inventors: Lawrence Stenger, 30970 Montclair Dr., Lindstrom, Minn. 55045; Reginald E. Bronson, 186 Brookview Ct., Maplewood, Minn. 55109-4701

[21] Appl. No.: 622,534

[22] Filed: Mar. 25, 1996

[51] Int. Cl.$^6$ .................................................. B62D 25/14
[52] U.S. Cl. ............................................... 296/72; 411/84
[58] Field of Search ............................. 296/72; 52/582.1, 52/270, 284; 403/256, 259; 411/84; 248/903; 40/308

[56] References Cited

U.S. PATENT DOCUMENTS

| | | | |
|---|---|---|---|
| 2,144,350 | 1/1939 | Swanstrom | 411/84 |
| 2,237,595 | 4/1941 | Dyer | 411/84 |
| 2,341,829 | 2/1944 | Tinnerman | 411/84 |
| 2,395,650 | 2/1946 | Allen | 411/84 |
| 2,421,278 | 5/1947 | Luce | 411/84 |
| 2,705,991 | 4/1955 | Reiner | 411/84 |
| 2,879,820 | 3/1959 | Trzcinski | 411/84 |
| 5,419,665 | 5/1995 | Adams et al. | 411/84 |

*Primary Examiner*—Gary C. Hoge
*Attorney, Agent, or Firm*—Jacobson & Johnson

[57] ABSTRACT

A dashboard attachment kit including an attachment member having nuts secured to one side of the attachment member with the attachment member including openings therein for securing a rivet fastener to the body of a vehicle and the attachment member with the method of attaching a dashboard to a vehicle body comprising the steps of placing the attachment member adjacent a portion of the vehicle and than drilling holes through the vehicle body using the holes in the attachment member as a guide. In the next step the fastener is extended through the vehicle body and through the attachment member to secure the attachment member to the vehicle body. After securing the attachment member to the vehicle body the replacement dashboard is placed adjacent the vehicle body and further fasteners are extended through the dashboard and vehicle body into a member secured to the attachment member.

13 Claims, 2 Drawing Sheets

DASHBOARD ATTACHMENT KIT

FIELD OF THE INVENTION

This invention relates generally to attachment kits and more particularly to a dashboard attachment kit and a method for securing a replacement dashboard to a motor vehicle.

BACKGROUND OF THE INVENTION

Most motor vehicles have a dashboard that extends across the front portion of the passenger compartment. Typically, the instruments and controls for heaters, radio and the like are mounted to and extend through the dashboard. For esthetic reasons or because the dashboard might have been damaged, an owner might wish to replace the dashboard. The problem of replacing dashboards becomes particularly difficult when the body of the vehicle is made of fiberglass as it is difficult to secure the replacement dashboard to the body of the vehicle once the original fasteners have been removed from the vehicle body and the dashboard. The present invention provides a dashboard attachment kit including an attachment member for securing a replacement dashboard to a vehicle body as well as a method of attaching a replacement dashboard to the body of an existing motor vehicle.

SUMMARY OF THE INVENTION

Briefly, the present invention comprises a dashboard attachment kit including an elongated attachment member having nuts secured to one side of the attachment member with the attachment member including openings therein for securing a rivet to the body of a vehicle and the attachment member with the method of attaching the replacement dashboard comprising the steps of placing the attachment member adjacent the front portion of the vehicle and than drilling holes through the vehicle body using the holes in the attachment member as a guide. In the next step, a fastener is extended through the vehicle body and through the attachment member to secure the attachment member to the vehicle body. After securing the attachment member to the vehicle body, the replacement dashboard is placed adjacent the vehicle body and fasteners are extended through the dashboard and vehicle body into a nut secured to the attachment member.

DESCRIPTION OF THE PREFERRED EMBODIMENT

Figure 1:
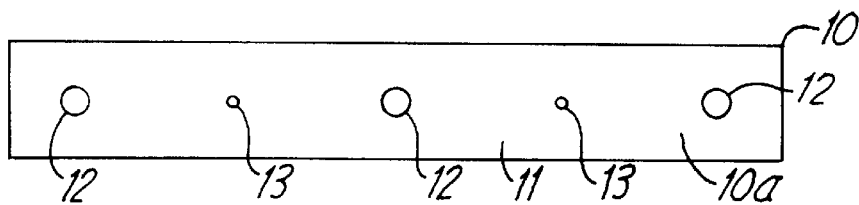
FIG. 1 shows a front view of the attachment member for securing a dashboard to a vehicle body.

FIG. 1 shows the front view of an elongated attachment member 10 for securing a replacement dashboard to a vehicle body. The attachment member 10 includes a first larger set of openings 12 and second set of smaller openings 13. The face 10a of attachment member 10 is smooth and contains no irregularities that might make it difficult to lay flat against a portion of a vehicle body.

Figure 2:
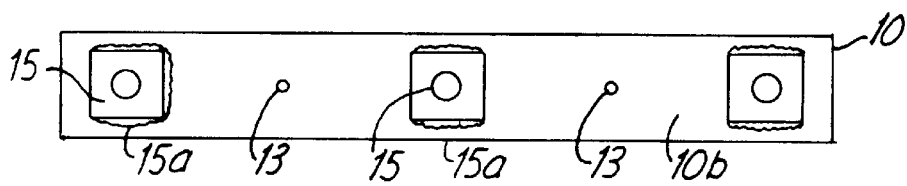
FIG. 2 shows a back view of the attachment member of FIG. 1.

FIG. 2 shows a back view of attachment member 10 with a set of three nuts 15 secured to the back side 10b through a weld 15a. The nuts 15 include an internal thread to enable securing a threaded fastener through the nut 15 and through the attachment member 10.

Figure 3:
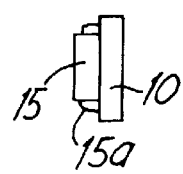
FIG. 3 shows a side view of the attachment member of FIG. 1.

FIG. 3 shows a side view of the attachment member 10 showing the nut 15 secured to attachment member 10 through a weld 15a.

Figure 4:
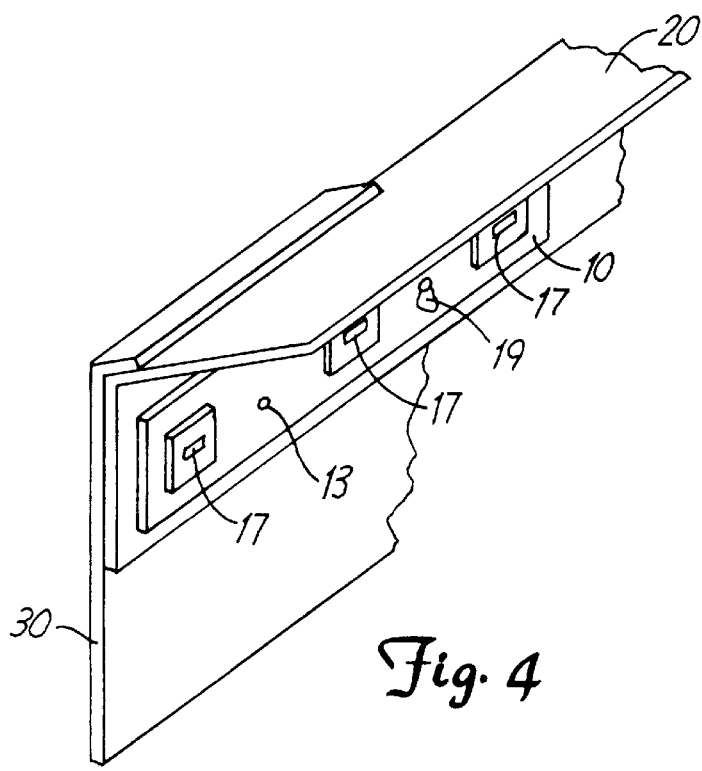
FIG. 4 shows a partial perspective view of an attachment member securing a replacement dashboard to a vehicle body.

FIG. 4 shows a partial perspective view showing a portion of a vehicle body 20 and a replacement dashboard 30 secured to the vehicle body 20 through threaded fasteners 17 extending through the dashboard 30, vehicle body 10 and nuts 15. Attachment member 10 is shown secured to vehicle body 20 through a rivet fastener 19 that has splayed ends. For purposes of illustrating the invention, the rivet fasteners 19 have not been shown in hole 13. Normally, rivet fasteners 19 secure the attachment member 10 to the vehicle body 20 and provide means for securing the dashboard 30 thereto.

To illustrate the operation and use of the invention, reference should be made to FIGS. 5–9 which illustrate how the attachment member 10 is secured to the vehicle body 20 as well as how the dashboard 30 is secured to the attachment member 10 and the vehicle body 20.

Figure 5:
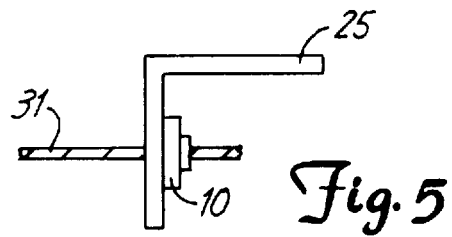
FIG. 5 shows the step of forming a hole in a vehicle body for securing the attachment member to the vehicle body.

FIG. 5 shows a drill bit 31 forming a hole in the fiberglass vehicle body 20 with the drill bit 31 extending through the fiberglass body 10 and the opening 13 in the attachment member 10 which is typically made of metal. If desired, the attachment member 10 can be used as template to drill the holes in the vehicle body 10.

Figure 6:
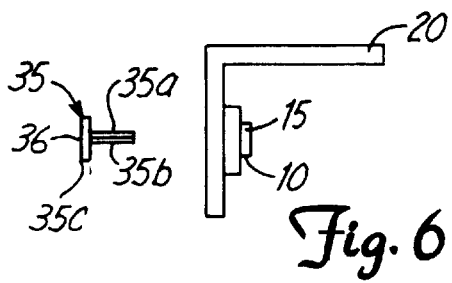
FIG. 6 is an exploded side view showing a fastener for securing the attachment member of FIG. 1 to the vehicle body.

FIG. 6 shows an exploded view of a rivet fastener 35, vehicle body 20 and attachment member 10 prior to insertion of rivet fastener 35 therein. Rivet fastener 35 includes a low profile flat head and radially projecting bendable legs 35a and 35b that can be splayed outward to prevent withdrawal of the rivet fastener 35.

Figure 6A:
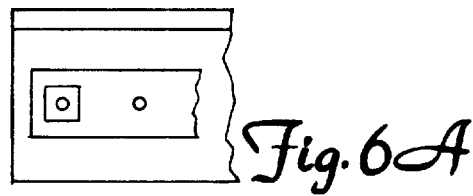
FIG. 6A is a back view of the embodiment of FIG. 6.

FIG. 6A shows a back view of the attachment member 10 positioned on vehicle body 20 to enable the rivet fastener 35 to secure the attachment member 10 to vehicle body 20.

Figure 7:
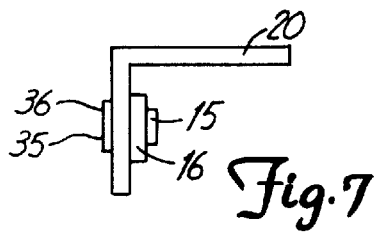
FIG. 7 is a side view showing the fastener securing the attachment member to the body of a vehicle.

FIGS. 7 shows a side view of the vehicle body 20 and attachment member with the rivet fastener 35 securing the attachment member to vehicle body 20. Rivet fastener head 35c is shown with a flat low profile head and has a flat face 36.

Figure 7A:
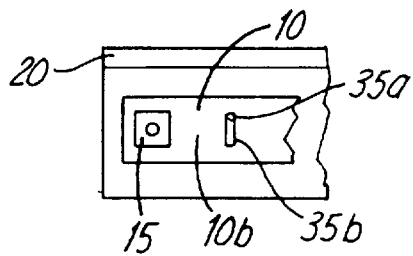
FIG. 7A is a back view showing the fastener securing the attachment member to the body of a vehicle.

FIG. 7A shows the back view of FIG. 7 illustrating that rivet fastener ends 35a and 35b extend through attachment member 10 and arc splayed outward to hold the attachment member 10 to vehicle body 20. That is, the rivet fastener head 35c engages a relatively large area of one side of the fiberglass body 20 and the attachment member 10 engages an even larger area of the opposite side of the vehicle body 20. The use of the rivet fastener 35 allows one to sandwich the vehicle body portion 20 between the head 35c of rivet 35 and the splayed ends 35a and 35b of rivet 35.

Figure 8:
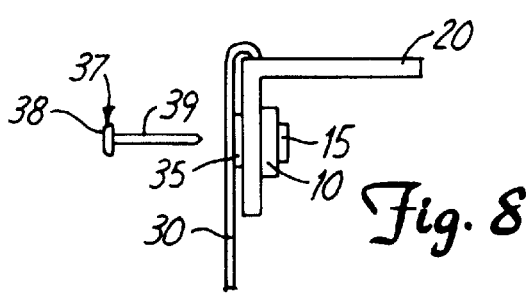
FIG. 8 is an exploded side view showing a replacement dashboard and threaded fastener for securing the replacement dashboard to the vehicle body.

FIG. 8 shows a replacement dashboard 30 placed over head 35 and in engagement with the body portion 20. A threaded fastener 37 is positioned outward of member 10 and vehicle body 20 and includes a head 38 and a threaded section for engagement with nut 15.

Figure 9:
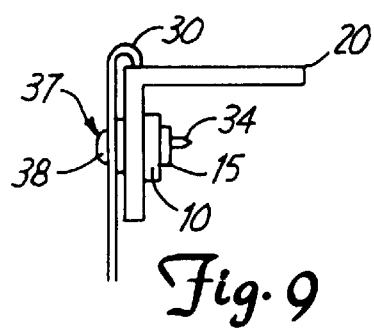
FIG. 9 is a side view showing the replacement dashboard secured to the vehicle body.

FIG. 9 shows the side view with threaded fastener 37 securing the replacement dashboard 30 to the vehicle body through nut 15 on attachment member 10.

Figure 9A:
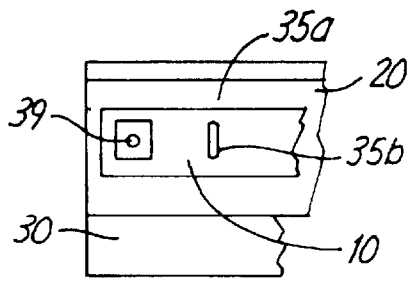
FIG. 9A is a back view showing the replacement dashboard secured to the vehicle body.

FIG. 9A shows the back view of the attachment member with attachment member 10 being secured to body 20 though splayed ends 35a and 35b of rivet fastener 35 and the threaded fastener 39 securing the replacement dashboard 30 to the body 20. While only one threaded fastener 37 and one rivet fastener 35 is shown, it is apparent that additional fasteners can be used to secure the attachment member to the vehicle body. In addition multiple attachment members can be used to secure the dashboard to the vehicle body 20 with the multiple attachment members spaced along the vehicle body 20 and the dashboard.

The attachment kit of the present invention includes an attachment member, a set of threaded fasteners and a set of low profile splayable rivet fasteners for securing the attachment member to a portion of a body of a vehicle. If needed the attachment kit can include a plurality of attachment members and plurality of sets of fasteners for spacedly attachment of the attachment members to a vehicle body.

We claim:

1. In combination:
   a fiberglass vehicle body;
   a replacement dashboard for attachment to the fiberglass vehicle body;
   a dashboard attachment kit, said dashboard attachment kit including
   an attachment member, said attachment member having a first side and a second side, said attachment member having an opening extending therethrough;
   a nut secured to said first side of said attachment member;
   a first fastener for extending through and securing the attachment member to the fiberglass vehicle body; and
   a second fastener, said first fastener and said second fastener cooperating so that the attachment member can be secured to the fiberglass vehicle body to enable the replacement dashboard to be secured to the fiberglass vehicle body by a second fastener extending through the replacement dashboard and the attachment member.

2. The dashboard attachment kit of claim 1 wherein the attachment member has a flat surface securable to a mating surface.

3. The dashboard attachment kit of claim 2 wherein the first fastener comprises a rivet having a splayable head.

4. The dashboard attachment kit of claim 3 wherein the second fastener includes a threaded section.

5. The dashboard attachment kit of claim 4 wherein the nut includes threads therein for threaded engagement with said threaded section.

6. The dashboard attachment kit of claim 5 wherein the attachment member is an elongated metal strip.

7. The dashboard attachment kit of claim 6 including at least two attachment members.

8. The dashboard attachment kit of claim 6 wherein the nut is welded to said attachment member.

9. A method of fastening a replacement dashboard to a vehicle having a fiberglass body comprising the steps of:
   removing an original dashboard from a fiberglass vehicle body;
   drilling a hole in the fiberglass vehicle body;
   placing a dashboard attachment member having a nut adjacent the vehicle body so a hole in the attachment member is in alignment with the hole in the vehicle body;
   extending a first fastener through the fiberglass vehicle body and through the attachment member to secure the attachment member to the vehicle body;
   placing a replacement dashboard proximate the fiberglass vehicle body and the attachment member; and
   extending a second fastener through the replacement dashboard and the fiberglass vehicle body and into engagement with the attachment member to thereby secure the replacement dashboard to the fiberglass vehicle body in a sandwich type relationship.

10. The method of claim 9 including the step of splaying the first fastener to secure the attachment member to the vehicle.

11. The method of claim 10 including the step of threading the second fastener into a nut on the attachment member.

12. The method of claim 11 including the step of using the attachment member as a template when drilling a hole in the vehicle body.

13. The method of claim 12 including the step of using a low profile first fastener to hold the attachment member to the vehicle body.

* * * * *